United States Patent [19]
Martinez

[11] 3,835,304
[45] Sept. 10, 1974

[54] CHEMICAL MIGRATION RATIO INSTRUMENT
[76] Inventor: Sylvia Martinez, 1111 Pizarro St., Coral Gables, Fla. 33134
[22] Filed: Dec. 19, 1972
[21] Appl. No.: 316,552

[52] U.S. Cl.......... 235/151.3, 235/151.12, 235/184, 23/252
[51] Int. Cl. ........................ G01n 33/00, G06g 7/16
[58] Field of Search....... 235/151.3, 151.35, 151.12, 235/194, 195, 184; 324/71; 23/252, 259

[56] References Cited
UNITED STATES PATENTS

| | | | |
|---|---|---|---|
| 3,600,567 | 8/1971 | Varnela | 235/151.12 X |
| 3,634,868 | 1/1972 | Pelavin et al. | 235/151.3 |
| 3,654,445 | 4/1972 | Mikkelsen et al. | 235/151.3 |
| 3,718,439 | 2/1973 | Rosse et al. | 235/151.12 X |

Primary Examiner—Charles E. Atkinson
Assistant Examiner—Edward J. Wise
Attorney, Agent, or Firm—Clarence A. O'Brien & Harvey B. Jacobson

[57] ABSTRACT

An instrument for calculating chemical migration ratios or the like on a test surface, said instrument comprising a pointer adapted to overlie the test surface, control means for moving the pointer to selected locations relative to the test surface, circuit means associated with the control means for providing electrical signals representative of the position of the pointer relative to the test surface, and meter means responsive to the electrical signals for providing readings corresponding to the pointer positions. The circuit means may include memory means for storing the readings for comparison with subsequent readings.

20 Claims, 12 Drawing Figures

PATENTED SEP 10 1974

CHEMICAL MIGRATION RATIO INSTRUMENT

The present invention is generally related to electrical instruments and, more particularly, to a versatile instrument for expeditiously providing readings representative of migration ratios on test surfaces without the need for time consuming manual measurements.

In recent years, many developments have been made in chromatography techniques utilized in analytical chemistry. One such analysis is the determination of chemical migration, or the ability of a chemical sample to migrate or travel in a known solvent or other medium on a test surface. Generally, this has been achieved by depositing an amount of the sample at a selected point on the test surface. After allowing sufficient time for migration to occur, chemical agents or the like are applied at different points on the test surface to provide visual detection or identity of the presence of the test sample. In this manner, the migration distance of the test sample from the origin point is determined and compared to a reference distance to provide a ratio of distances, commonly referred to as the chemical migration ratio. In the past, conventional techniques were employed for measuring such distances and calculating the ratio therebetween. Most often, this was done manually with a common ruler or measuring tape, with the ratios being calculated by hand or with the aid of conventional calculating devices. It is apparent that such measuring techniques were most time-consuming and tiring, particularly when several tests were performed at one time, as was not uncommon.

Therefore, it is an object of the present invention to provide a means for expeditiously calculating chemical migration ratios or the like on a test surface without the need for time-consuming manual measuring and calculations.

Another object of the present invention is to provide a novel migration ratio instrument including a pointer adapted to overlie a test surface, and movable by a control associated with a meter circuit, whereby meter readings are provided representative of the pointer positions relative to the test surface.

It is a further object of the present invention to provide a unique migration ratio instrument including circuit means coupled to a meter and provided with memory means for storage of meter readings to provide comparison with subsequent readings.

Still another object of the present invention is to provide a versatile laboratory instrument which is of compact, durable construction comprised of a relatively small number of parts, and which provides accurate readings of migration ratios on test surfaces with a minimum amount of effort by the user.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
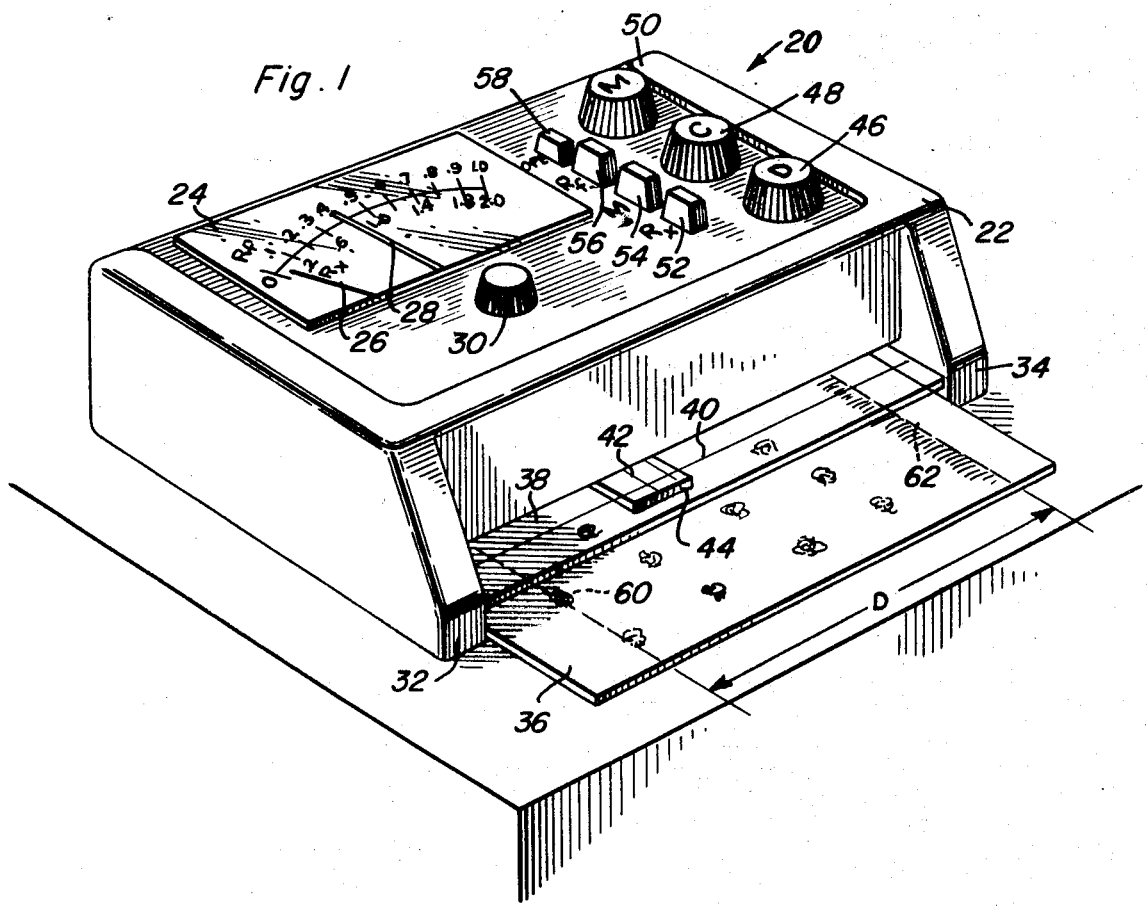
FIG. 1 is a perspective view of the migration ratio instrument of the present invention shown with a typical test surface.
Figure 2:
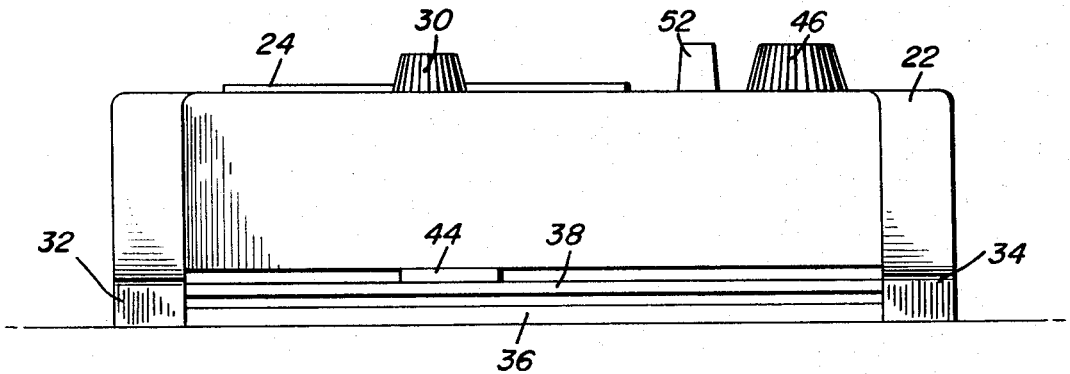
FIG. 2 is a front elevation of the instrument shown in FIG. 1.

Referring now, more particularly, to FIGS. 1 and 2 of the drawings, the first embodiment of the instrument of the present invention is generally indicated by the numeral 20 and includes a generally rectangular housing 22, preferably of molded plastic construction, with a transparent cover 24 overlying an indicating scale associated with a conventional instrument movement. The scale is arranged to provide both $R_f$ and $R_x$ readings which have particular meaning to the migration ratio tests, as hereinafter explained. The instrument is provided with an indicating needle 26 which is moved in response to electrical signals from the instrument circuitry. In addition, a memory pointer 28 is visible through cover 24 and is connected to a manually settable knob 30 to permit selective setting at any one of the scale readings.

The bottom of the instrument housing is provided with a pair of spaced leg portions 32 and 34 which define an elongated opening adapted to receive a flat test surface member, such as that indicated at 36. An elongated panel 38 of plastic or other transparent material extends between leg portions 32 and 34 and is adapted to overlie the test surface when such is inserted in the opening. Panel 38 is provided with an elongated reference line 40 which cooperates with a hairline 42 perpendicular thereto and carried by a transparent pointer 44 which is movable along the length of reference line 40. Reference line 40 and hairline 42 provide a pair of cross lines for visual alignment with selected points on the underlying test surface to obtain the desired migration ratio readings.

It will be appreciated that the instrument is provided with various controls including a drive control knob 46, mechanically coupled to pointer 44, as hereinafter explained. In addition, a calibration control knob 48 and memory setting knob 50 are provided for selective operation by the user in obtaining the desired readings. A plurality of pushbutton switches 52, 54, 56 and 58 protrude from the top of the instrument housing to perform various switching functions, as hereinafter explained. In operation, drive control knob 46 is rotated to effect movement of pointer 44 to selected test points located between an origin line 60 and a solvent front line 62 indicated in dash line on the test surface. For each position of the pointer along reference line 40, the instrument provides a corresponding migration ratio reading.

Figure 3:
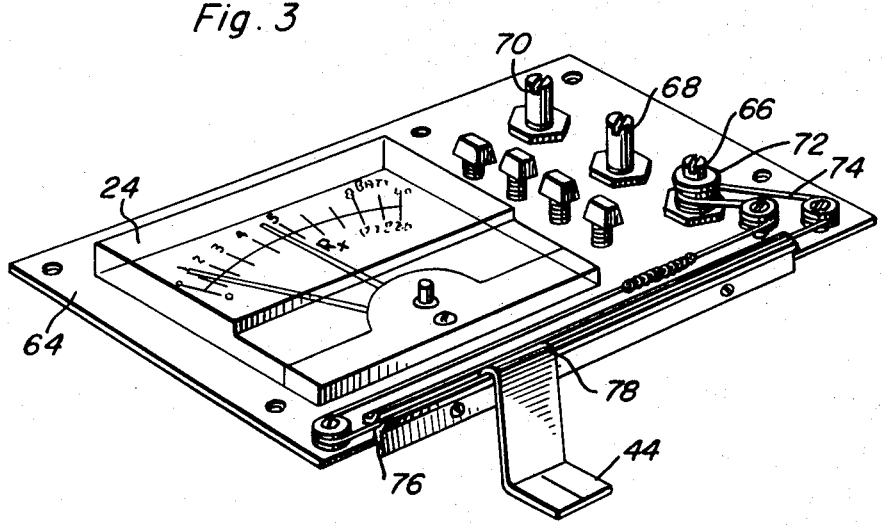
FIG. 3 is a perspective view of the internal mechanism associated with the instrument shown in FIG. 1.

Referring now, more particularly, to FIG. 3, the internal mechanism of the instrument illustrated in FIG. 1 may be seen to include a generally rectangular mounting frame 64 which rotatably supports control shafts 66, 68 and 70 associated with knobs 46, 48 and 50, respectively. Each control shaft is coupled to an adjustable potentiometer, or equivalent circuit element, which is connected to the above-mentioned circuitry. A pulley 72 is affixed to shaft 66 to effect movement of a flexible drive cord 74 and pointer 44. Preferably, an elongated guide track 76 is fastened to mounting frame 64 for supporting pointer 44 at its upper end as indicated at 78. Shaft 66 and the associated pulleys are arranged such that rotation of the shaft produces corresponding movement between the pointer and associated potentiometer. This produces changes in the output signals from the circuitry to provide corresponding migration ratio readings.

Figure 4:
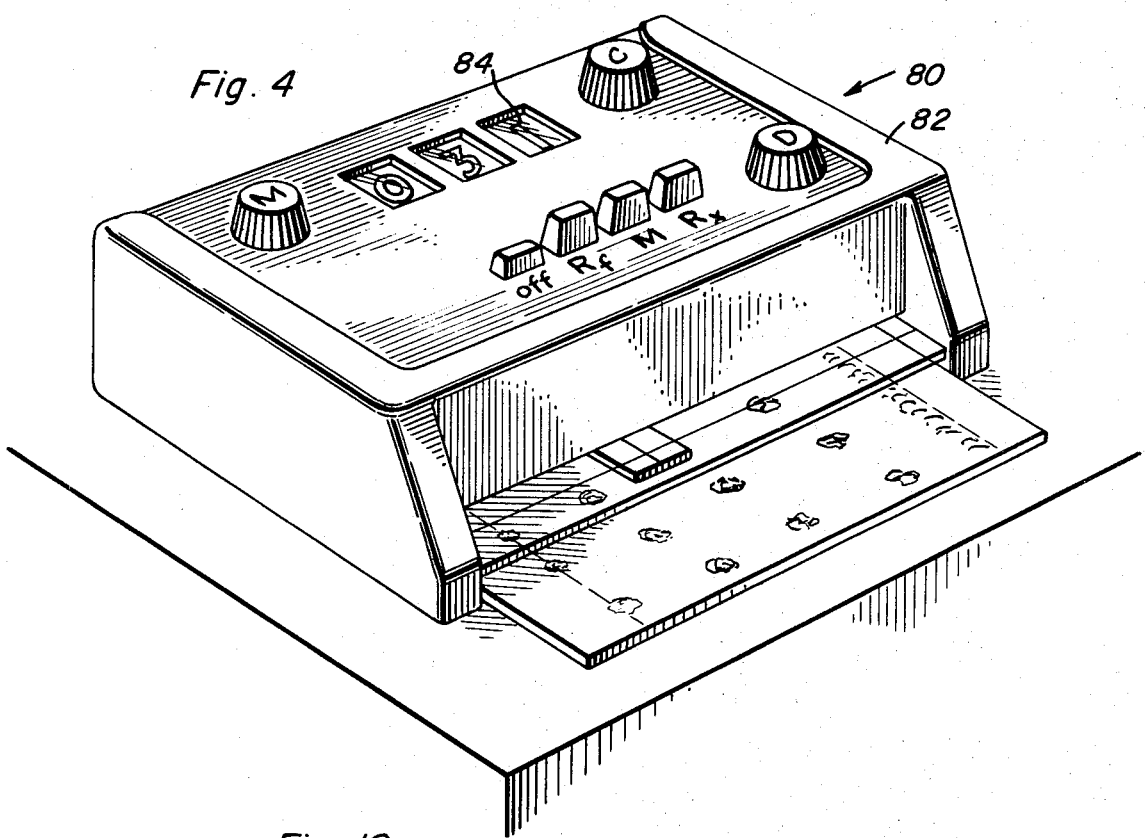
FIG. 4 is a perspective view of a second embodiment of the instrument of the present invention.

With particular reference to FIG. 4, a second embodiment of the instrument of the present invention is generally indicated by the numeral 80 and includes a housing 82 of configuration similar to that of the embodiment illustrated in FIG. 1. The second embodiment is similar to the first, but is provided with a digital readout, rather than a conventional needle instrument movement. In addition, the drive, calibration and memory control knobs are mounted at different locations on the upper surface of the housing, with the pushbutton switches mounted parallel to the front edge of the housing. A plurality of relatively small display windows 84 are mounted adjacent to each other on the top of the housing where the digital readings may be easily observed. Operation of the second embodiment is essentially the same as the first embodiment, except that a memory pointer is not provided, making it necessary to write down an initial reading if it is to be compared with subsequent readings.

As explained above, each migration ratio reading corresponds to the ratio of the distance between a test point and origin reference point to the distance separating the origin reference point from a solvent front reference point. This basic migration ratio reading is hereinafter referred to as the $R_f$ reading. Since it is often desirable to compare subsequent $R_f$ readings to an initial $R_f$ reading, the instrument includes means for providing a $R_x$ reading, where $R_x = R_{f2}/R_{f1}$.

Figure 5A:
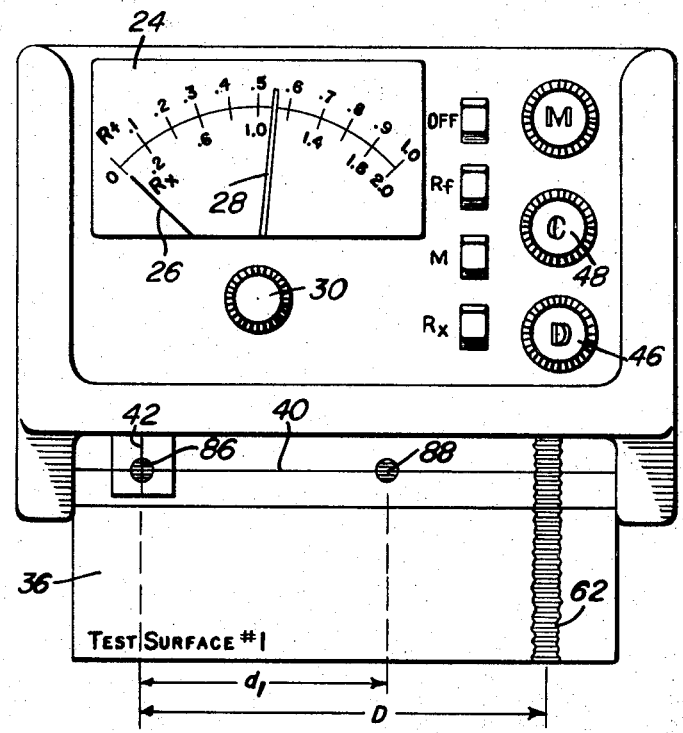
FIG. 5a is a plan view of the instrument shown in FIG. 1 with the associated reference pointer at a first position relative to the test surface.
Figure 5B:
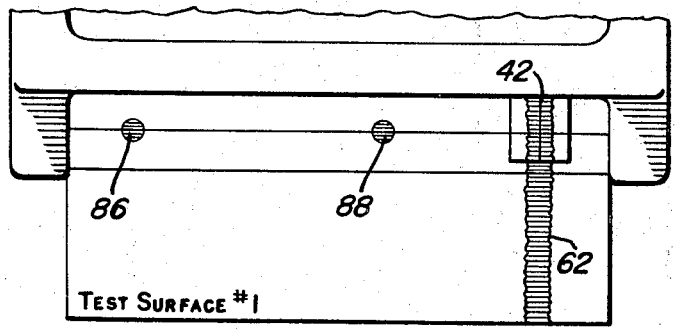
FIGS. 5b and 5c are partial plan views of the instrument shown in FIG. 5a, but with the reference pointer at different positions.
Figure 5C:
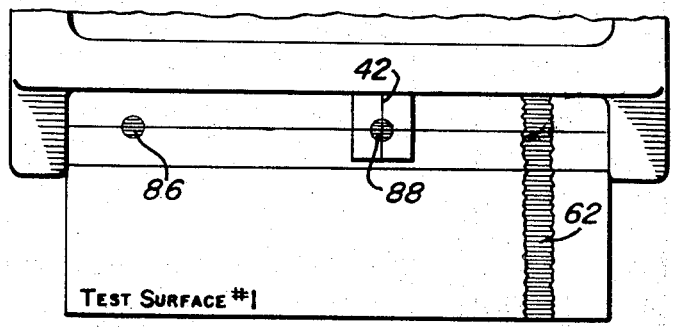

With particular reference to FIGS. 5a–5c, the procedure for making $R_f$ readings will be more specifically explained. Initially, the test surface No. 1 is inserted in the opening provided in the instrument housing with an origin reference point 86 and a test sample point 88 in underlying alignment with reference line 40. The $R_f$ push button is depressed and drive control knob 46 is rotated to position the pointer hairline 42 in its extreme left position and the origin reference 86 on the test surface is then moved to coincide with the point defined by the intersection of reference line 40 and pointer hairline 42. With the pointer in this position, the instrument needle 26 should read zero. The circuit is provided with internal adjustments to permit calibration of the instrument to provide a proper zero reading. With the $R_f$ pushbutton 56 still in the depressed position, the drive control knob is again rotated to bring the pointer into alignment with solvent front at 62, as indicated in FIG. 5b. With the pointer in this position, calibration control knob 48 is manually rotated to set the instrument needle at a reading of 1.0 on the $R_f$ scale. The drive control knob is again rotated to set the pointer in alignment with test spot 88 as indicated in FIG. 5c. Movement of the drive control knob provides a corresponding deflection of the instrument needle to provide the desired $R_f$ migration ratio reading. Mathematically, this reading is equal to $d_1/D$. With test spot 88 being to the right a distance of 6/10ths of the total distance ($D$) separating the origin and solvent front, the instrument needle will read .6 on the $R_f$ scale.

Figure 6:
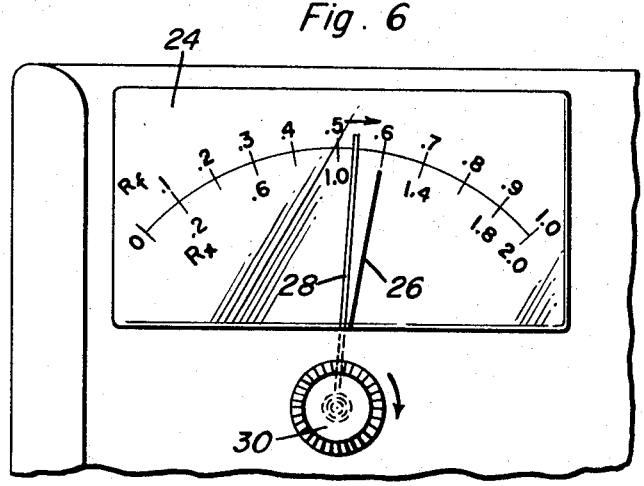
FIG. 6 is a plan view of the meter associated with the instrument shown in FIG. 1.
Figure 7:
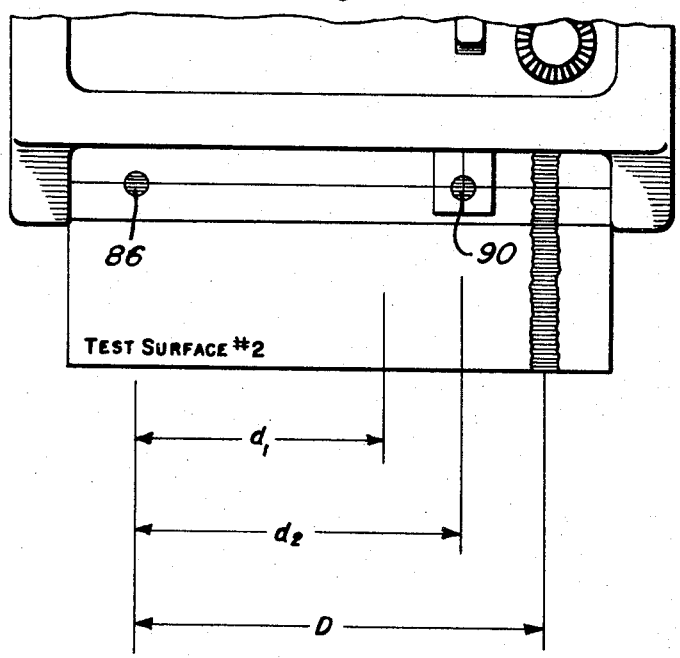
FIG. 7 is a partial plan view of the instrument shown in FIG. 5a but with a second test surface.

With reference to FIGS. 6 and 7, the procedure for the $R_x$ readings may be more fully explained. Assuming that the first reading, hereinafter referred to as $R_{f1}$, is 0.6, memory pointer 28 is moved to the right by clockwise rotation of knob 30 until it is in alignment with instrument needle 26, as indicated in FIG. 6. Pushbutton 54 is then depressed and memory control knob 50 is rotated until instrument needle 26 is set at the memory pointer (the original $R_{f1}$ reading). A second test surface is inserted in the instrument opening with a second test sample point 90 provided thereon. Pushbutton 56 is again depressed, and the dirve control knob is rorated to the right for alignment with the solvent front in a manner explained above. Calibration knob 48 is rotated to provide a 1.0 reading on the $R_f$ scale. Control knob 46 is then rotated to set the pointer in alignment with the new test point 90, and the $R_x$ pushbutton 52 is depressed to provide a $R_x$ reading. Mathematically, the $R_x$ reading is equal to $Rf_2/Rf_1$, which is equal to $d_2/d_1$ when distance $D$ is the same for the two test surfaces involved.

Figure 8:
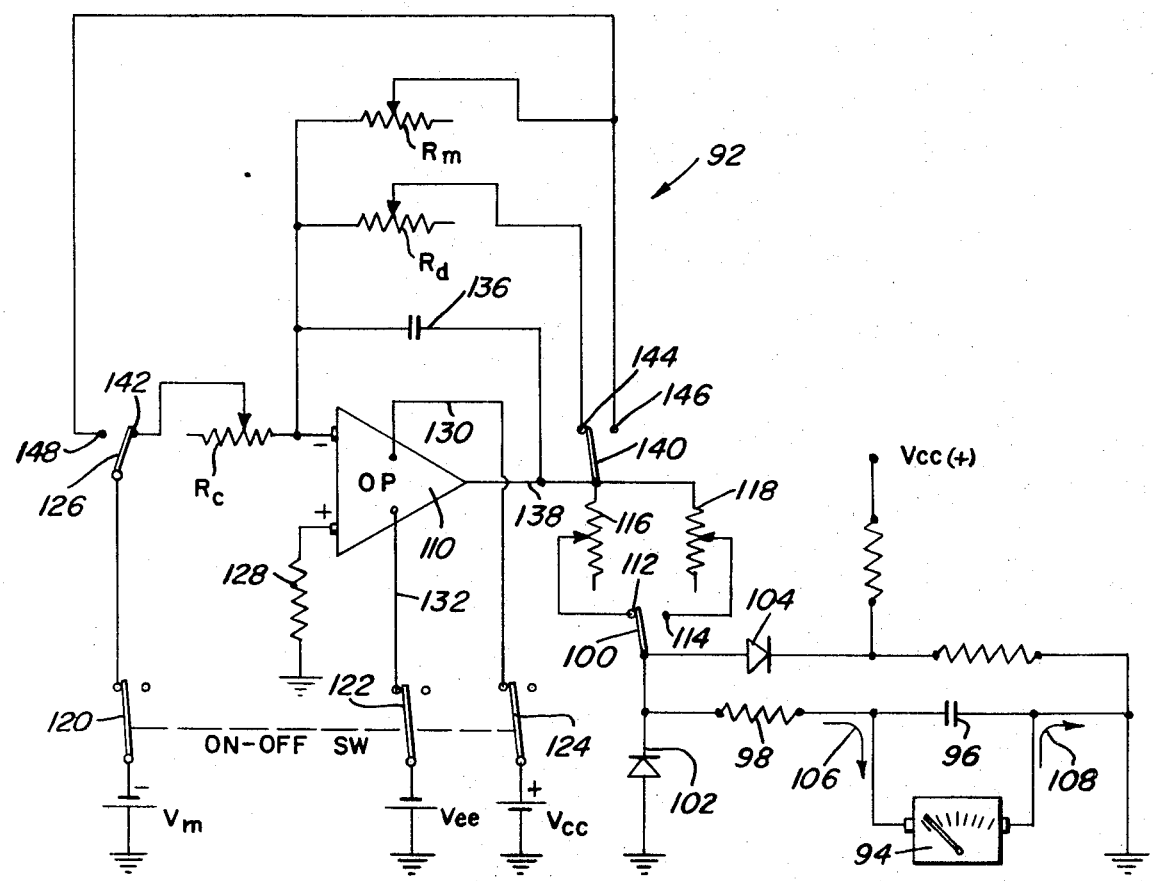
FIG. 8 is a schematic diagram of the circuitry associated with the first embodiment of the present invention.

With reference to FIG. 8, the circuitry associated with the first embodiment of the present invention is generally indicated by the numeral 92 and includes a conventional d.c. ammeter 94 connected in parallel with a capacitor 96. Input signals to the meter are received through input resistor 98 connected to the instrument circuitry by way of a single-pole, double-throw switch 100. A pair of clamping diodes 102 and 104 are provided in the meter circuitry to protect the meter against over voltage or under voltage conditions. With this arrangement, meter 94 responds to voltage signals received through switch 100 which cause currents to flow through the meter as indicated by arrows 106 and 108. Of course, it is not intended that the present invention be limited to the above-described ammeter circuit, as other circuits may be utilized, if desired, to provide similar results.

It will be appreciated that deflection of meter 94 is proportional to the voltage signals received through switch 100. Such voltage is a function of the output of an operational amplifier 110, which provides output to points 112 and 114 through adjustable resistors 116 and 118, respectively. The gain of the operational amplifier is proportional to the ratio of the feedback resistance to the input resistance. These resistances are in the form of manually adjustable potentiometers $R_d$, $R_c$ and $R_m$, associated with the above-described controls 46, 48 and 50, respectively.

The instrument is provided with three d.c. voltage sources, preferably batteries, $V_m$, $V_{ee}$ and $V_{cc}$, which are connected to the circuit by way of an on-off switch mechanism comprising three ganged, single-pole, single-throw switches 120, 122 and 124, shown in the "on" position in FIG. 8. When pushbutton 58 is released, by depression of one of the other pushbuttons, the battery sources are connected to the operational amplifier circuit, as illustrated in FIG. 8. Potentiometer $R_c$ is connected to the negative input terminal of the operational amplifier and is connected to $V_m$ by way of single-pole, double-throw switch 126 when the $R_f$ pushbutton 56 is depressed. The positive terminal of operational amplifier 110 is connected to ground through resistance 128, with leads 130 and 132 being connected to $V_{cc}$ and $V_{ee}$, respectively. A capacitor 136 is connected between the negative input of the operational amplifier in output line 138 to provide by-pass of any a.c. signals. Potentiometers $R_d$ and $R_m$ are both connected to the negative input of the operational amplifier and selectively connected to the amplifier output 138 by way of switch 140.

It will be appreciated that switches 100, 120, 122, 124, 126 and 140 are associated with the above-mentioned pushbuttons and preferably are mechanically interlocked in a well-known manner. This provides a convenient means of selecting the various modes of operation of the instrument for making both $R_f$ and $R_x$ readings.

Operation of the circuitry shown in FIG. 8 may be described as follows. With the $R_f$ pushbutton depressed, the switches 120, 122 and 124 are closed for appropriate connection of the voltage sources to the circuitry. Switch 126 is connected to potentiometer $R_c$ through point 142, while switches 140 and 100 make contact with points 144 and 112, respectively. Thus, the input and feedback resistances of the operational amplifier are defined by the set values of potentiometers $R_c$ and $R_d$, respectively. When the drive control knob 46 is rotated to move the instrument pointer to its extreme left position, the resistance of $R_d$ is reduced, such that meter 94 should read 0 on the $R_f$ scale. This 0 reading may be adjusted, if necessary, by adjustable resistance 116. Subsequent operation of the drive control knob moves the instrument pointer into alignment with the solvent front. $R_c$ is then adjusted by rotation of calibration knob 48 to provide a meter reading 1.0. The drive control knob is again rotated to bring the pointer into alignment with the test sample point. This, of course, results in a decrease in the value of $R_d$ to provide the appropriate meter reading. The value of $R_d$ is a linear function of the instrument pointer position between the origin and solvent fronts reference points to provide a meter reading which is representative of the ratio of the distance separating the pointer from the origin front and the distance between the origin and solvent front points.

When utilizing the instrument of the present invention to provide an $R_x$ comparison reading, memory pushbutton switch 54 is depressed which shifts switch 140 to point 146 to connect potentiometer $R_m$ in the feedback circuit of the operational amplifier while disconnecting $R_d$ therefrom. The memory control knob 50 associated with $R_m$ is then rotated to provide a meter reading the same as the original meter reading ($R_{f1}$). This, in effect, sets the value of $R_m$ equal to $R_{d1}/D$. The $R_f$ pushbutton then depressed, returning switch 140 to position 144, and the above-described procedure is repeated for calibrating the meter to the 1.0 reading when the instrument pointer is in alignment with the solvent front. The drive control knob is then rotated to bring the pointer into alignment with the second test point to provide an $R_{f2}$ reading. The $R_x$ pushbutton 52 is then depressed and with switch 140 in position 146, switch 126 is moved to position 148, and switch 100 is shifted to position 114. This connection arrangement provides potentiometer $R_m$ as the input resistance, the $R_d$ being the feedback resistance. In effect, this provides a meter reading corresponding to the ratio of $R_{f2}/R_{f1}$. Algebraically, this may be described as follows:

$$R_x = R_{f2}/R_{f1}$$
$$= R_{d2}/R_{c2}/R_{d1}/R_{c1}$$

Each distance from the origin to the solvent front is individually adjusted for each determination ($R_c$). Only in the case where these distances are identical the values of individual $R_c$'s are equal and then $R_x = R_{d2}/R_{d1}$. When making the $R_x$ readings, the gain of the operational amplifier will be proportional to the ratio of $R_{f2}/R_m$, where $R_m$ equals $R_{f1}$.

From the foregoing description, it will be appreciated that the circuitry of the present invention not only provides a convenient and expeditious manner of obtaining $R_f$ migration ratio readings, but also provides an analog memory by which $R_f$ readings may be compared to each other. It should be noted that it is not intended that the invention be limited to the exact circuitry illustrated, as various forms of operational amplifiers and meter circuits may be utilized, if desired.

Figure 10:
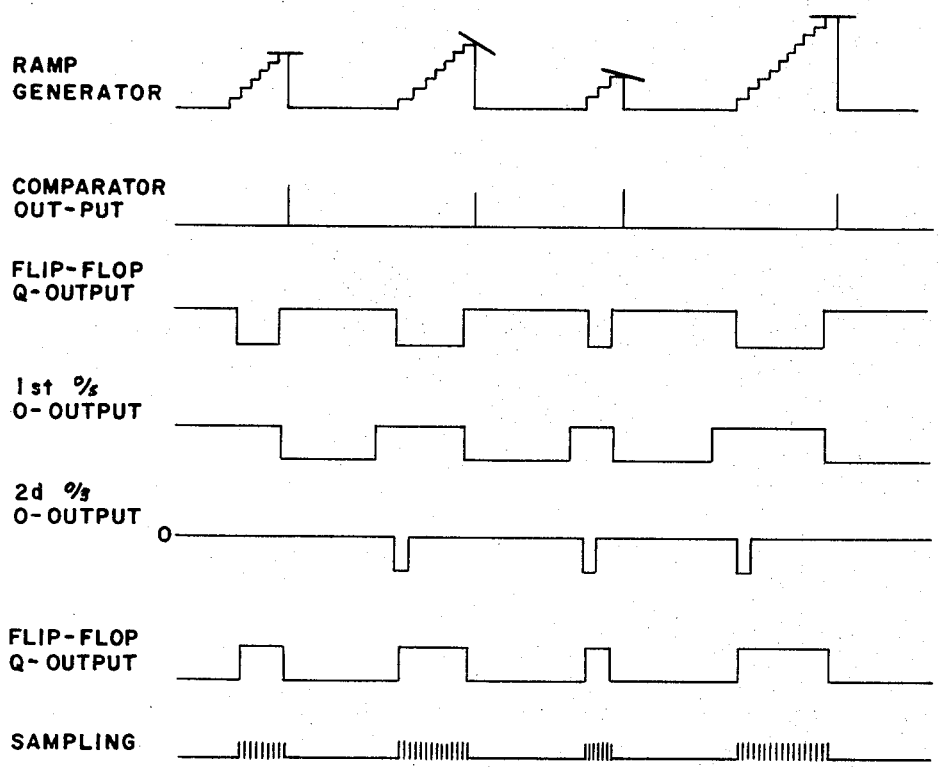
FIG. 10 is a diagrammatic illustration of typical wave forms associated with the circuitry of the second embodiment illustrated in FIG. 4.
Figure 9:
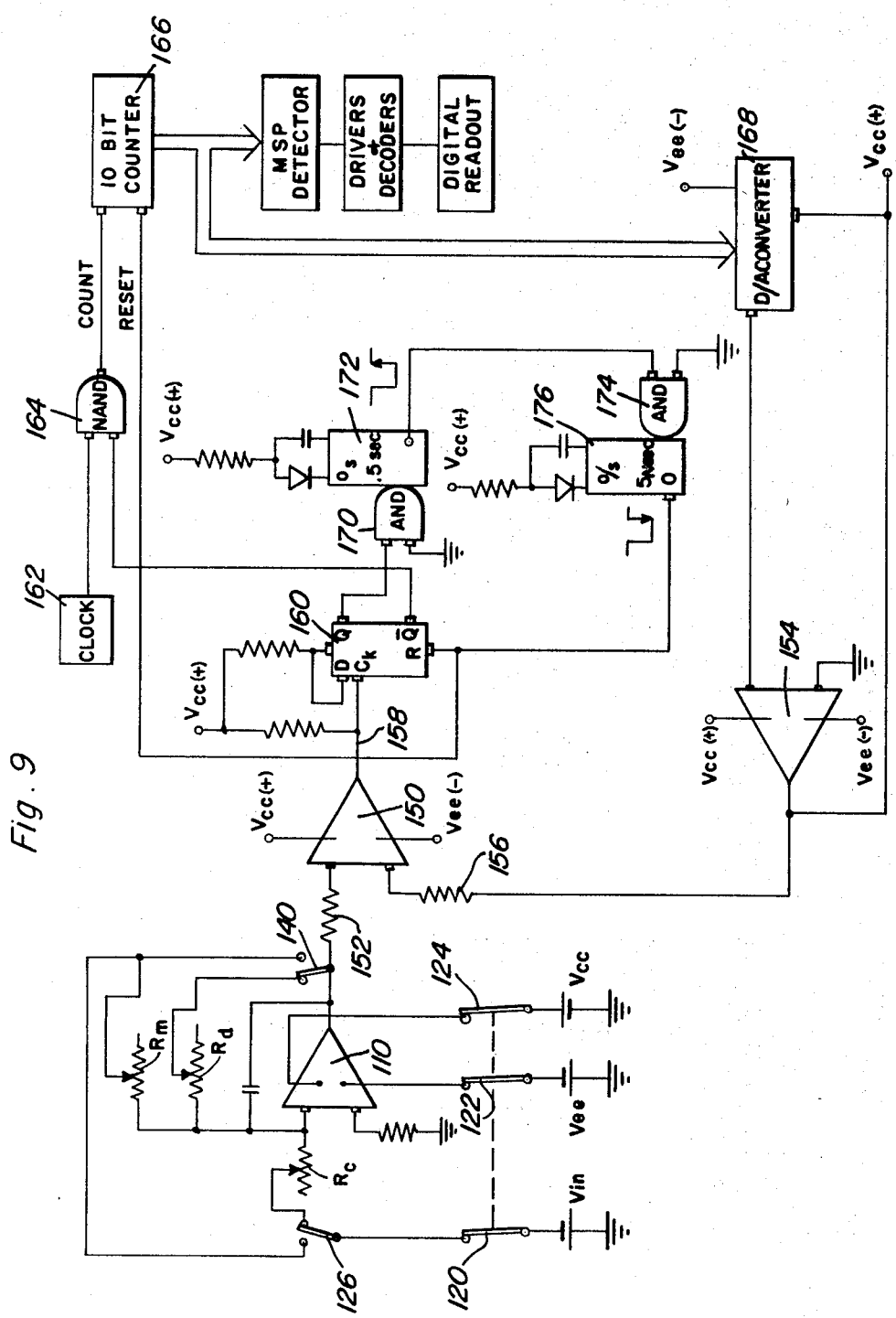
FIG. 9 is a schematic diagram of the circuitry associated with the second embodiment illustrated in FIG. 4.

Referring now, more particularly, to FIGS. 9 and 10, the schematic diagram of the circuitry of the second embodiment of the present invention and wave forms associated therewith may be seen. Operation of the circuitry of the second embodiment is essentially the same as that described above, with the basic difference that the second embodiment provides digital readout, rather than a conventional ammeter type readout. It is not intended that the digital readout circuitry illustrated in FIG. 9 form a part of the present invention, such circuitry being a variation of well known digital readout circuits. Briefly, the operation may be explained as follows. The output signals from the operational amplifier 110 are fed to the input of a comparator 150 through an input resistor 152. This signal is compared with the output of a ramp generator 154, which is fed to comparator 150 through resistor 156. A typical output wave form of the ramp generator is illustrated in FIG. 10. When the magnitude of the ramp generator approaches the value of the input signal to the comparator from the operational amplifier, an output pulse is provided at comparator output 158. This pulse reverses the mode of a flip-flop circuit 160. A clock circuit 162 provides time pulses to a first input of a NAND circuit 164, with the switching of the NAND circuit being controlled by the Q output of flip-flop 160, to in turn control the count of a ten bit counter 166. The output from the counter is fed to appropriate digital readout equipment and to a digital-to-analog converter 168 which controls ramp generator 154. The Q output of flip-flop 160 is fed to an AND circuit 170 for control of a multivibrator 172, the output of which is fed to a second AND circuit 174 and multi-vibrator 176. Wave forms of the flip-flop, and multi-vibrator outputs are illustrated in FIG. 10. The output signals from multi-vibrator 176 are effective to reset the counter 166 and flip-flop 160.

It will be appreciated that the circuitry illustrated in FIG. 8 included switch 100 and a pair of adjustable resistors 116 and 118 for providing a "zero" adjustment and providing a more concentrated $R_x$ scale on the meter. With the digital readout circuit, such a switch and resistors are unnecessary.

From the foregoing disclosure, it will be appreciated that the operation of the migration ratio instrument of the present invention is a relatively simple procedure, requiring a minimum amount of time and effort to obtain each reading. Since the distances are effectively measured by the instrument and the ratio therebetween automatically calculated, the probability of error as compared with conventional techniques, is greatly reduced. In addition, by providing an analog memory it is possible to expeditiously obtain comparison readings of two or more migration ratios.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An instrument for providing readings corresponding to positions on a test surface or the like, said instrument comprising movable pointer means, control means for selectively moving said pointer means between first and second reference points corresponding to spaced positions on said test surface, circuit means for providing electrical output signals, and readout means connected to said circuit means and responsive to said output signals for providing corresponding readings, said circuit means including means connected to said control means for varying said output signals as a function of position of said pointer means relative to said reference points.

2. The structure set forth in claim 1 wherein said readout means provides a test sample reading when said pointer means is positioned at a test point, said reading corresponding to the ratio of the distance separating said first reference point from said test point and the distance separating said first and second reference points.

3. The structure set forth in claim 2 wherein said circuit means includes means for selectively calibrating said readout means to provide a reference reading when said pointer is at one of said reference points.

4. The structure set forth in claim 3 wherein said circuit means includes means for memory of at least one test sample reading for comparing subsequent test sample readings therewith to provide a comparison reading corresponding to the ratio of said subsequent test sample readings to said one test sample reading.

5. The structure set forth in claim 4 wherein said means connected to said control means for varying said output signals as a function of pointer position includes a first selectively adjustable circuit element mechanically coupled to said control means.

6. The structure set forth in claim 5 wherein said calibration means includes a second selectively adjustable circuit element, said memory means includes a third selectively adjustable circuit element, said circuit means further including switch means for setting the value of said third circuit element equal to that of said first circuit element and substituting said third circuit element for said second circuit element to provide said comparison readings when said pointer means is moved to the subsequent test sample positions.

7. The structure set forth in claim 6 wherein said circuit means includes means for producing said output signals proportional to the ratio of the values of said first and second circuit elements when said switch means is in a first position to provide said test sample readings.

8. The structure set forth in claim 7 wherein said circuit means produces output signals proportional to the ratio of the value of said third circuit element to said second circuit element when said switch means is in a second position for setting the value of said third circuit element equal to the value of said first circuit element.

9. The structure set forth in claim 8 wherein said circuit means produces output signals proportional to the ratio of the values of said third circuit element to said first circuit element when said switch means is in a position for providing said comparison readings.

10. The structure set forth in claim 9 wherein said first, second and third circuit elements each comprise an adjustable resistance element.

11. The structure set forth in claim 10 wherein said circuit means includes an operational amplifier, said second resistance element being connected to the input of said operational amplifier, said first resistance element being in a feedback loop between the input and output of said operational amplifier, and said third resistance element in effect removed from said circuit means when said switch means is in said first position.

12. The structure set forth in claim 11 wherein said third resistance element is in a feedback loop between the input and output of said operational amplifier and said first resistance element is effectively removed from said circuit means when said switch means is in said second position.

13. The structure set forth in claim 12 wherein said third resistance element is disconnected from the output of said operational amplifier and substituted for said second resistance element, and said first resistance element is in a feedback loop between the input and output of said operational amplifier when said switch means is in said second position.

14. An instrument for providing readings corresponding to the ratio of migration distances on a test surface or the like, said instrument comprising a movable pointer adapted to be moved along a reference line overlying the test surface, actuator means for selectively moving said pointer between first and second reference points spaced a first distance apart on said test surface to selected test points spaced a second distance from said first reference point, circuit means for providing electrical output signals, and readout means connected to said circuit means to provide readings corresponding to said output signals, said circuit means including means for varying said output signals as a function of the ratios of said distances.

15. The structure set forth in claim 14 wherein said circuit means includes memory means for storing a reading for ratio comparison with subsequent readings.

16. The structure set forth in claim 14 wherein said circuit means includes means mechanically coupled to said actuator means for varying said output signals in response to movement of said actuator means and pointer.

17. The structure set forth in claim 16 wherein said circuit means varies the strength of said output signals as a function of the ratio of said second distance to said first distance.

18. The structure set forth in claim 17 wherein said circuit means includes memory means for storing a reading for comparison with subsequent readings.

19. An instrument for measuring migration ratios or the like on a test surface, said instrument comprising a housing, means including an elongated reference line associated with said housing for visually citing points on the test surface, said citing means including a movable pointer associated with said housing and extending transversely of said reference line, drive means for selectively moving said pointer to test points along said reference line, circuit means for providing electrical output signals, and readout means responsive to said output signals for providing readings representative of each position of said pointer relative to a pair of reference points along said reference line, said circuit means including means coupled to said drive means for varying said output signals as a function of pointer position.

20. The structure set forth in claim 19 wherein said circuit means includes means for varying the strength of said output signal as a function of the ratio of the distance of said test point from one of the reference points to the distance between said reference points.

* * * * *